2 Sheets—Sheet 1.

G. H. WALDO.
Washing-Machine.

No. 7,961. Reissued Nov. 20, 1877.

WITNESSES
Edw. F. Nottingham
F. O. McCleary

INVENTOR
George H. Waldo
By H. A. Seymour
ATTORNEY

THE NORRIS PETERS CO., PHOTO-LITHO., WASHINGTON, D. C.

G. H. WALDO.
Washing-Machine.

No. 7,961 Reissued Nov. 20, 1877.

WITNESSES
Ed. J. Nottingham
F. O. McCleary

INVENTOR
George H. Waldo
By H. A. Seymour,
ATTORNEY

THE NORRIS PETERS CO., PHOTO-LITHO., WASHINGTON, D. C.

UNITED STATES PATENT OFFICE.

GEORGE H. WALDO, OF PRATTSBURG, NEW YORK.

IMPROVEMENT IN WASHING-MACHINES.

Specification forming part of Letters Patent No. 187,994, dated March 6, 1877; Reissue No. 7,961, dated November 20, 1877; application filed October 19, 1877.

*To all whom it may concern:*

Be it known that I, GEORGE H. WALDO, of Prattsburg, in the county of Steuben and State of New York, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improved pounder washing-machine; the object of the invention being to provide a washing-machine of such a construction that the actuating-lever to which the pounder is secured may be moved in any desired position within the tub while the distance from the end of the actuating-lever to its fulcrum shall remain unchanged during the varying positions of the pounder, thus insuring an equal and unchangeable leverage at all times.

My invention consists, first, in the combination, with the actuating-lever of a pounder washing-machine, of a fulcrum, adapted to be moved toward or from the center of the tub in any direction by means of the actuating-lever, the said parts being connected in such a manner that the pounder may be freely moved either in a vertical, lateral, or longitudinal direction, as may be desired.

My invention further consists in the combination, with the actuating-lever of a pounder washing-machine, of a laterally-vibrating fulcrum located above the tub, with which it is connected, said fulcrum adapted to be freely moved in a lateral direction by the actuating-lever.

My invention further consists in the combination, with the actuating-lever of a pounder washing-machine, of a pendulous support, attached to a standard removably secured to the side of the tub.

My invention further consists in the combination, with a pendulous support, of an actuating-lever, provided with a vertically-adjustable pounder.

My invention further consists in the combination, with a pendulous support, of an actuating-lever, provided with a pounder adapted to have a rocking movement, whereby said pounder may assume a vertical position regardless of the position of the actuating-lever.

Figure 1:
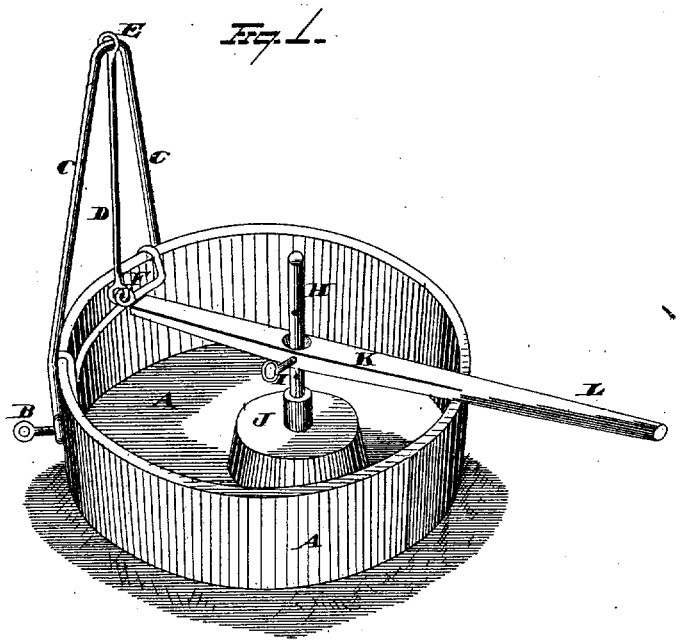
Figure 2:
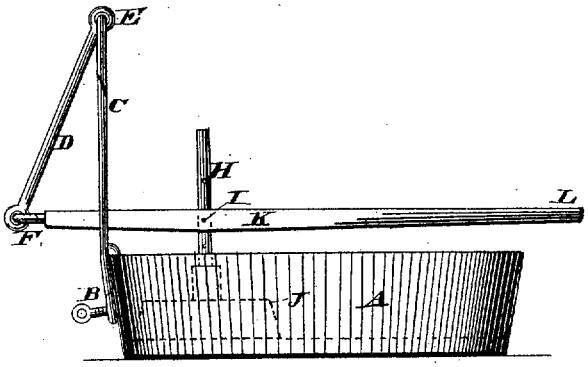
Figure 3:
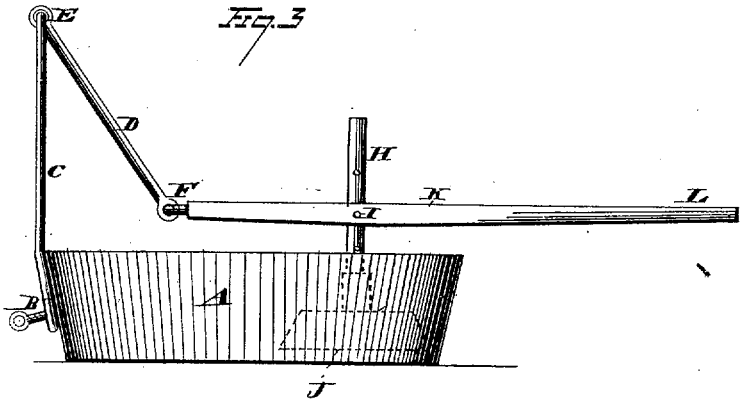
Figure 4:
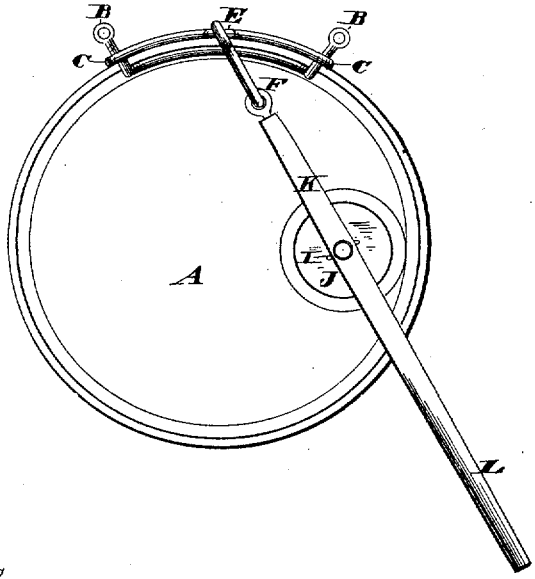

In the accompanying drawings, Figure 1 is a view, in perspective, of my improved washing-machine. Figs. 2, 3, and 4 show the pounder in its different positions while in use.

A represents a wash-tub. B B are two clasps to attach the standards C C to the tub, which stand perpendicularly from the edge of the tub, and are arranged in such a manner at the top that the swing can be attached at the point E and form a joint, thus allowing the swing D to swing freely across the edge of the tub. The swing D is of suitable length to pass freely above the tub, and at the lower end is provided with a joint, F, allowing the lever K full play at the opposite end in a perpendicular direction, and also allow it a lateral motion at this point. H is the handle of the pounder or beater J, and is attached to the lever K at the point I by passing through the lever K, and provided with a pin passing laterally through both, or in any convenient way, thus holding the pounder in its upward and downward motion with the lever, yet allowing it to swing to and from the standards C C, thus keeping the pounder-handle in a perpendicular position at any elevation or depression of the lever K.

The operator grasps the lever at the handle end L, which is moved freely in any direction, thus acting on the clothes in the tub at any desired point and pressing down the pounder firmly with great ease.

Having fully described my invention, what I claim as new, and desire to secure by Letters Patent, is—

1. In a pounder washing-machine, the combination, with an actuating-lever having a pounder attached thereto, of a fulcrum adapted to be moved toward or from the center of the tub in any direction, the said lever and movable fulcrum being connected in such a manner that the pounder may be freely moved either in a vertical, lateral, or longitudinal direction, substantially as described.

2. In a pounder washing-machine, the combination, with an actuating-lever having a pounder attached thereto, of a laterally-vibrating fulcrum, located above the edge of the tub, with which it is connected, said fulcrum adapted to be freely moved by the actuating-lever, substantially as described.

3. In a pounder washing-machine, the combination, with an actuating-lever having a pounder attached thereto, of a pendulous support attached to a standard removably secured to the side of a tub, substantially as described.

4. In a pounder washing-machine, the combination, with a fulcrum adapted to be moved toward or from the center of the tub in any direction, of an actuating-lever provided with a vertically-adjustable pounder, substantially as described.

5. In a pounder washing-machine, the combination, with a fulcrum adapted to be moved toward or from the center of the tub in any direction, of an actuating-lever provided with a pounder adapted to have a rocking movement, substantially as described.

In testimony that I claim the foregoing I have hereunto set my hand and seal this 15th day of October, 1877.

GEORGE H. WALDO. [L. S.]

Witnesses:
LUCIEN REED,
WILLIAM S. CHALKER.